United States Patent [19]
Shinohara

[11] Patent Number: 4,821,623
[45] Date of Patent: Apr. 18, 1989

[54] VACUUM TYPE BOOSTER

[75] Inventor: Takayoshi Shinohara, Ueda, Japan

[73] Assignee: Nissin Kogyo Kabushiki Kaisha, Nagano, Japan

[21] Appl. No.: 137,297

[22] Filed: Dec. 22, 1987

[30] Foreign Application Priority Data

Jan. 6, 1987 [JP] Japan .................................. 62-516[U]
Jan. 6, 1987 [JP] Japan .................................. 62-520[U]

[51] Int. Cl.⁴ ........................... F15B 9/10; F01B 29/00
[52] U.S. Cl. ...................................... 91/376 R; 92/99; 92/128; 92/256
[58] Field of Search .................. 92/169.1, 169.2, 169.3, 92/169.4, 128, 255, 256, 99, 98 D; 91/376 R; 403/348, 349

[56] References Cited

U.S. PATENT DOCUMENTS

| | | | |
|---|---|---|---|
| 4,283,993 | 8/1981 | Hayashida et al. | 91/376 R |
| 4,348,944 | 9/1982 | Ochiai | 92/99 X |
| 4,394,833 | 7/1983 | Weiler et al. | 91/376 R |
| 4,658,704 | 4/1987 | Mori et al. | 91/376 R |

FOREIGN PATENT DOCUMENTS

| | | | |
|---|---|---|---|
| 57-18552 | 1/1982 | Japan | 92/99 |
| 57-114753 | 7/1982 | Japan . | |
| 60-67251 | 4/1985 | Japan . | |

Primary Examiner—Robert E. Garrett
Assistant Examiner—Williamson

Attorney, Agent, or Firm—Armstrong, Nikaido, Marmelstein & Kubovcik

[57] ABSTRACT

A vacuum type booster which includes a booster piston reciprocatively movable in a shell, a valve sleeve for a control valve fitted to the booster piston and having a disengagement preventive flange superposed on the piston, and a clamp plate engaged with pawls formed by cutting and bending portions of the booster piston for clamping the flange to the booster piston. The booster piston includes pairs of reinforcement ribs which cross the turning direction of the clamp plate and sandwich cutout holes resulting from formation of the pawls. A pair of the ribs on the rear side of the turning direction of the clamp plate permit the clamp plate to turn in a direction for engagement with the pawls and inhibits the clamp plate from turning in the disengaging direction. A space is provided between the outer peripheral part of the disengagement preventive flange and an engagement piece jointing part of the clamp plate body. The booster piston and the disengagement preventive flange include concave-convex engagement parts for inhibiting rotation of the valve sleeve. The booster piston is provided with further reinforcement ribs of an arcuate cross-sectional shape which project forwardly and are adapted to be in contact with the outer peripheral part of the rear surface of the flange. The disengagement preventive flange is also formed with a relief which extends around the outer peripheral part of the flange. A contact surface on the relief located away from the piston surface and reinforcement ribs on the piston serves to restrict forward deflection of the piston.

19 Claims, 6 Drawing Sheets

VACUUM TYPE BOOSTER

BACKGROUND OF THE INVENTION

1. Field of the Invention

The present invention relates to a vacuum type booster and more particularly to a booster of the type including a booster shell, a booster piston accommodated in the interior of the booster shell in a manner reciprocatively movable forwardly and rearwardly and dividing the interior of the shell into a first working chamber leading to a vacuum source and a second working chamber adapted to be selectively communicated with the first working chamber or the atmosphere via a control valve, a valve sleeve for the control valve which is fitted into a valve sleeve fitting hole located in the central part of the booster piston and which has a disengagement preventive flange superposed on the fore surface of the booster piston, and a clamp plate placed in resilient engagement with a plurality of engagement pawls on the booster piston for clamping the disengagement preventive flange in cooperation with the booster piston.

2. Description of the Prior Art

This kind of vacuum type booster is provided with a plurality of engagement pawls on a booster piston. The pawls are formed by cutting and bending operations so that the booster piston becomes weakened due to provision of holes which are formed as a result of cutting and bending operations for the engagement pawls. In view of possible weakening of the booster piston as mentioned above, a conventional booster is formed with reinforcement ribs between the aforesaid holes and a valve sleeve fitting hole in order to inhibit the booster piston from being weakened. However, the aforesaid reinforcement ribs could serve to reinforce only the surrounding area of the holes resulting from cutting out the pawls.

Further, a conventional booster includes a plurality of engagement pieces formed on the clamp plate so as to project radially outwardly of the disengagement preventive flange and adapted to come in resilient engagement with a plurality of engagement pawls on the booster piston. However, due to the fact that the outer peripheral part of the fore surface of the disengagement preventive flange is located very close to the engagement piece joining portions of the clamp plate, a fulcrum for allowing flexing of each the engagement pieces is located on the outer peripheral edge of the flange fore surface. As a result, the distance between the engagement piece and the fulcrum is quite short and a satisfactory spring function can not be obtained for the engagement pieces, making it difficult to achieve engagement of the booster piston with the clamp plate.

Further, a conventional booster is so constructed that a diaphragm, having an outer peripheral bead immovably secured to the peripheral wall of the booster shell and an inner peripheral bead secured to the opening edge of a valve sleeve fitting hole located at the center of the booster shell, is superposed on the rear surface of the booster piston. When the clamp plate is mounted to the booster piston, it is turned in the circumferential direction until it is engaged with the engagement pawls. However, when a valve sleeve is caused to rotate relative to the booster piston by turning operation of the clamp plate, the inner peripheral bead of the diaphragm may be twisted, resulting in the inner peripheral bead being disengaged from the opening edge of the valve sleeve fitting hole or the deterioration in durability of the diaphragm. To obviate the problems inherent to the conventional booster as mentioned above, it has been proposed that cutout portions are provided on the flange and are engaged with the outer peripheral surface of a fitting sleeve of a seal member for a tie rod in order to inhibit the valve sleeve from being rotated relative to the booster piston. However, this arrangement causes a structure for inhibiting the valve sleeve from being rotated to become complicated.

Furthermore, since the above-described conventional booster is so constructed that the outer peripheral part of the rear surface of the disengagement preventive flange is located very close to the fore surface of the booster piston, a fulcrum for forward flexing of the booster piston becomes located on the outer peripheral edge of the rear surface of the disengagement preventive flange. As a result, when the booster piston is flexed forwardly, this forward deflection is received by the aforesaid fulcrum. Accordingly, stress caused by the aforesaid flexing concentratively acts on a single place on the booster piston.

SUMMARY OF THE INVENTION

The present invention has been made with the foregoing background in mind and its object resides in providing a vacuum type booster which is entirely free from the drawbacks inherent to the conventional boosters.

Anther object of the present invention is to provide a vacuum type booster which is very simple in structure.

To accomplish the above objects there is proposed in accordance with one aspect of the present invention a vacuum type booster comprising a booster shell, a booster piston accommodated in an interior of said booster shell so as to be reciprocatively movable forwardly and rearwardly and dividing the interior of the booster shell into a first working chamber leading to a vacuum source and a second working chamber adapted to be selectively communicated with said first working chamber and the atmosphere via a control valve, a valve sleeve for said control valve, said valve sleeve being fitted into a valve sleeve fitting hole provided in a central area of the booster piston and having a disengagement preventive flange which is superposed on a fore surface of the booster piston, and a clamp plate placed in resilient engagement with a plurality of engagement pawls which are formed by cutting and bending on the booster piston for clamping said disengagement preventive flange in cooperation with the booster piston, the engagement of the cam plate with the pawls being obtained by turning the plate around a center line of the disengagement preventive flange, wherein the booster piston is provided with pairs of reinforcement ribs extending so as to cross the turning direction of the clamp plate, said reinforcement ribs in respective pairs being located sandwiching therebetween cutout hole which is provided as a result of cutting and bending formation of each of the engagement pawls, one pair of the reinforcement ribs being located on a rear side of the booster piston in the turning direction of the clamp plate and serving to permit the clamp plate to be turned in such a direction that the plate comes in engagement with the engagement pawls and prevent the clamp plate, after completion of such engagement, from being turned in a direction that the plate disengages from the pawls.

Further, there is proposed in accordance with another aspect of the present invention a vacuum type booster comprising a booster shell, a booster piston accommodated in an interior of said booster shell so as to be reciprocatively movable forwardly and rearwardly and dividing the interior of the booster shell into a first working chamber leading to a vacuum source and a second working chamber adapted to be selectively communicated with said first working chamber and the atmosphere via a control valve, a valve sleeve for said control valve, said valve sleeve being fitted into a valve sleeve fitting hole provided in a central area of the booster piston and having a disengagement preventive flange which is superposed on a fore surface of the booster piston, and a clamp plate including a clamp plate body adapted to be superposed on the fore surface of said disengagement preventive flange and a plurality of engagement pieces connected to said clamp plate body so as to project radially outwardly of the disengagement preventive flange, said engagement pieces being adapted to come in resilient engagement with a plurality of engagement pawls formed on the booster piston so as to clamp the disengagement preventive flange in cooperation with the booster piston, wherein a hollow space is provided between an outer peripheral part of the fore surface of the disengagement preventive flange and those parts of the clamp plate body which are connected to the engagement pieces and are located opposite to said outer peripheral part of the fore surface of the disengagement preventive flange.

Further, there is proposed in accordance with still further aspect of the present invention a vacuum type booster comprising a booster shell, a booster piston accommodated in an interior of said booster shell so as to be reciprocatively movable forwardly and rearwardly and dividing the interior of the booster shell into a first working chamber leading to a vacuum source and a second working chamber adapted to be selectively communicated with said first working chamber and the atmosphere via a control valve, a diaphragm superposed on a rear surface of said booster piston, said diaphragm having an outer peripheral bead fixedly secured to a peripheral wall of the booster shell and an inner peripheral bead fitted to an opening edge of a valve sleeve fitting hole which is provided at a center of the booster shell, a valve sleeve for said control valve fitted into an inner peripheral surface of the inner peripheral bead and having a disengagement preventive flange placed in abutment against a fore surface of the booster piston, a clamp plate held in engagement with a plurality of engagement pawls formed on the booster piston for clamping the disengagement preventive flange in cooperation with the booster piston, the engagement of said clamp plate with the pawls being obtained by turning the plate about a center line of the disengagement preventive flange, wherein the booster piston and the disengagement preventive flange are provided with concavo-convex engaging means which serves to inhibit the valve sleeve from being turned.

Moreover, there is proposed in accordance with still further aspect of the present invention a vacuum type booster comprising a booster shell, a booster piston accommodated in an interior of said booster shell so as to be reciprocatively movable forwardly and rearwardly and dividing the interior of the booster shell into a first working chamber leading to a vacuum source and a second working chamber adapted to be selectively communicated with said first working chamber and the atmosphere via a control valve, a valve sleeve for said control valve, said valve sleeve being fitted into a valve sleeve fitting hole provided in a central area of said booster piston and having a disengagement preventive flange which is superposed on a fore surface of the booster piston, and a clamp plate placed in resilient engagement with a plurality of engagement pawls formed on the booster piston for clamping said disengagement preventive flange in cooperation with the booster piston, wherein the booster piston is provided with reinforcement ribs of an arcuate cross-sectional shape which project forwardly and come in contact with an outer peripheral part of a rear surface of the disengagement preventive flange and wherein a contact area of each of the reinforcement ribs with the disengagement preventive flange is adapted to expand outwardly in a radial direction of the booster flange in response to the reinforcement ribs being deformed by forward deflection of the booster piston.

Further, there is proposed in accordance with a further aspect of the present invention a vacuum type booster comprising a booster shell, a booster piston accommodated in an interior of said booster shell so as to be reciprocatively movable forwardly and rearwardly and dividing the interior of the booster shell into a first working chamber leading to a vacuum source and a second working chamber adapted to be selectively communicated with said first working chamber and the atmosphere via a control valve, a valve sleeve for said control valve, said valve sleeve being fitted into a valve sleeve fitting hole provided in a central area of said booster piston and having a disengagement preventive flange which is superposed on a fore surface of the booster piston, and a clamp plate held in resilient engagement with a plurality of engagement pawls formed on the booster piston for clamping said disengagement preventive flange in cooperation with the booster piston, the engagement of said clamp plate with the engagement pawls being obtained by turning the clamp plate about a center line of the disengagement preventive flange, wherein the disengagement preventive flange is formed at a rear surface thereof with a relief extending around a whole outer peripheral part of the rear surface, said relief including a contact surface which is located away from the fore surface of the booster piston, and wherein at a portion of the booster piston opposed to the contact surface, a reinforcement rib is provided for limiting an extent of forward deflection of the booster piston by contacting with said contact surface when said extent of forward deflection of the booster piston increases, a certain clearance being kept between the contact surface and said reinforcement ribs.

As described above, each of cutout holes formed on the booster piston is located between a pair of reinforcement ribs so that the areas surrounding the cutout holes can be effectively reinforced by the reinforcement ribs. Moreover, since one of the reinforcement ribs functions also as a disengagement preventive means for the clamp plate, there is no need of providing any additional disengagement preventive means. Therefore, the number of production steps and production cost can be reduced.

Further, spring function of each of engagement pieces can be increased by employing a very simple arrangement that a hollow space is provided between the outer peripheral portion on the fore surface of the disengagement flange and the engagement piece jointing portions on the clamp plate body located opposite to the former whereby the disengagement preventive flange can be firmly held in place through cooperation of the booster piston and the clamp plate. Another advantageous effect of the present invention is that the aforesaid hollow space is obtainable merely by carrying out slight change of design on one of a ready-made valve sleeve and a clamp plate.

Further, due to the fact that structure for inhibiting the valve sleeve from being rotated can be built merely by providing a concave portion on one of the booster piston and the disengagement preventive flange and a convex portion on the other for engagement with the concave portion, the aforesaid structure can be simplified. Moreover, since inhibition of the valve sleeve from being rotated relative to the booster piston is achieved reliably with the aid of the concave-convex engagement portion, there is no fear that the inner peripheral bead of the diaphragm is twisted when the clamp plate is brought into engagement with the engagement pawls.

Further, it is arranged that the reinforcement ribs on the booster piston are in contact with the outer peripheral part of the rear surface of the disengagement preventive flange and the contact area of each reinforcement rib with the flange can be spread outwardly in the radial direction of the booster piston as the piston deflects. Therefore, stress caused by deflection of the booster piston is prevented from concentrically acting on one place of the piston and the moment of the piston is reduced so that, together with reinforcing effect obtained by reinforcement ribs, the durability of the booster piston can be improved.

Moreover, since the fulcrum for supporting deflection of the booster piston is shifted in dependence on a magnitude of difference in air pressure appearing between the working chambers, stress developed by the deflection of the booster piston does not concentrically act on one place on the booster piston. As a result, durability of the booster piston can be improved in addition to the effect of reinforcement which is obtained by means of the reinforcement ribs. Furthermore, since an extent of deflection of the booster piston is restricted by cooperation of the reinforcement ribs on the booster piston and the contact surface on the disengagement preventive flange, engaged state of the clamp plate with each of the engagement pawls can be maintained reliably. An additional advantageous effect of the present invention is that a relief and reinforcement ribs can be formed merely by carrying out slight change of design on a ready-made valve sleeve and a booster piston.

These and other objects, features and advantages of the present invention will become readily apparent from a reading of the following description of some preferred embodiments in conjunction with the accompanying drawings.

BRIEF DESCRIPTION OF THE DRAWINGS

The present invention will be illustrated in the following drawings;

FIG. 1 to FIGS. 4A and 4B illustrate a vacuum type booster in accordance with a first embodiment of the present invention.

FIGS. 4A and 4B are fragmental enlarged vertical sectional views of the booster respectively, particularly illustrating an area where the valve sleeve is fitted to the booster piston, in which FIG. 4A illustrates a state of the aforesaid area before deflection of the booster piston takes place and FIG. 4B illustrates a state of the aforesaid area after deflection of the booster piston took place.

FIG. 5 and FIGS. 6A and 6B illustrate a vacuum type booster in accordance with a second embodiment of the present invention.

FIGS. 6A and 6B are fragmental enlarged vertical sectional views of the booster similar to FIGS. 4A and 4B respectively, particularly illustrating an area where the valve sleeve is fitted to the booster piston, in which FIG. 6A illustrates a state of the aforesaid area before deflection of the booster piston takes place and FIG. 6B illustrates a state of the aforesaid area after deflection of the booster piston took place.

DESCRIPTION OF THE PREFERRED EMBODIMENTS

Now, embodiments of the present invention will be described in a greater detail hereunder with reference to the accompanying drawings.

Figure 1:
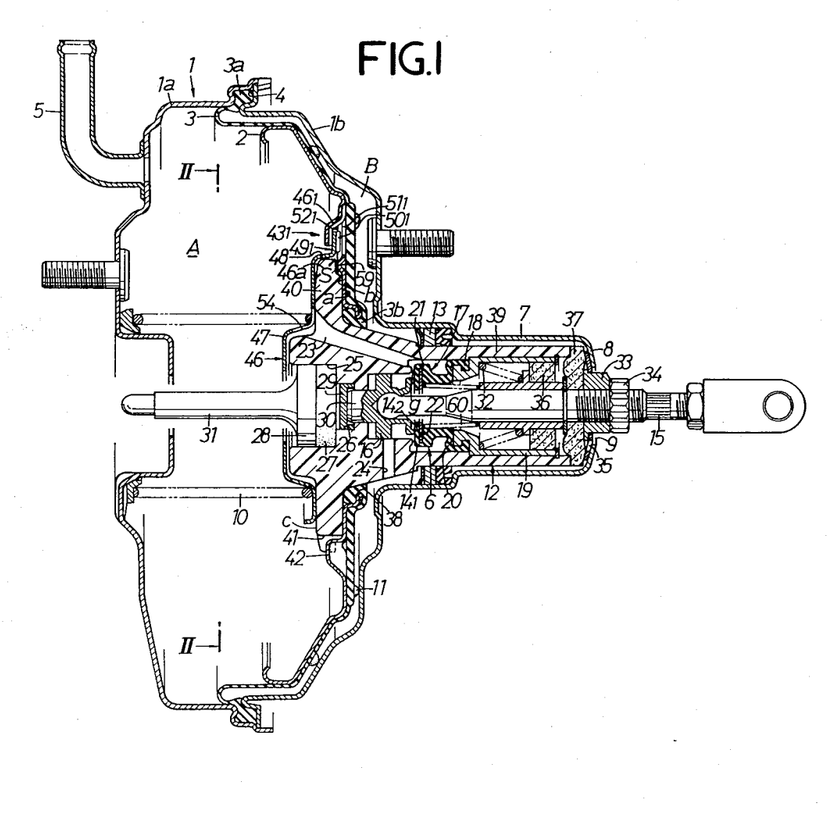
FIG. 1 is a vertical sectional view of the whole structure of the booster taken along line I—I of FIG. 2.
Figure 2:
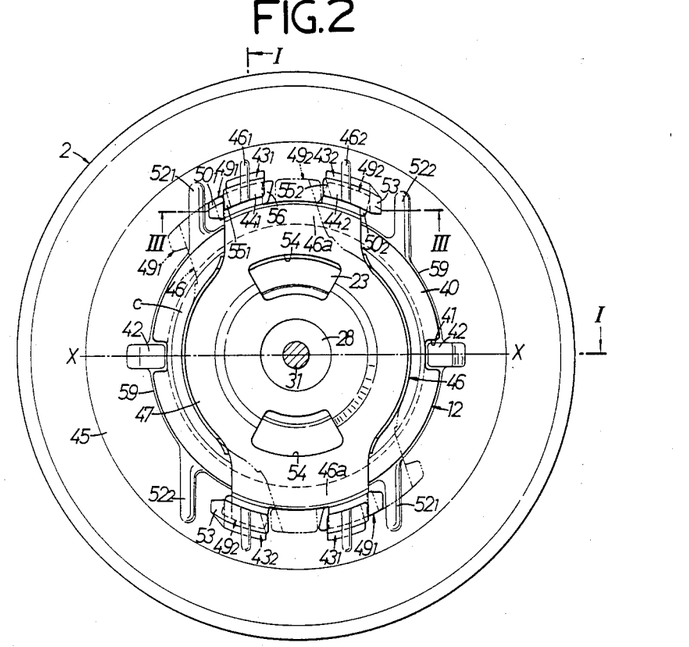
FIG. 2 is a cross-sectional view of the booster taken along line II—II of FIG. 1.

In FIGS. 1 and 2 which illustrate a first embodiment according to the invention, a booster piston 2 is accommodated in a booster shell 1 in a manner reciprocatively movable forwardly and backwardly, and the interior of the booster shell 1 is divided by the booster piston 2 into a fore part, that is, a first working chamber A and a rear part, that is, a second working chamber B.

The rear surface of the booster piston 2 is superposed on a diaphragm 3 of which an outer peripheral bead 3a is attached to a peripheral wall of the booster shell 1, i.e., an annular groove 4 which is defined in an abutment area of a fore shell 1a and a rear shell 1b. An inner peripheral bead 3b of the diaphragm 3 is fixedly secured to the inner peripheral portion of the booster piston 2. Description will be made later as to the attachment structure for the inner peripheral bead 3b.

The first working chamber A is normally communicated with an intake manifold of an engine (not shown) serving as a vacuum source via a vacuum introduction pipe 5, while the second working chamber B is selectively communicated via a control valve 6 to be described later with the first working chamber A or an atmosphere introduction port 9 opened at an end wall 8 of a rearward extension tube 7 of the booster shell 1.

The booster piston 2 is normally urged in the rearward direction, that is, toward the second working chamber B under the effect of resilient force of a return spring 10 which is accommodated in the first working chamber A in a compressed state, and its rearward movement is limited by allowing projections 11 projecting from the rear surface of the diaphragm 3 to come in contact with the inner surface of the rear wall of the booster shell 1.

The booster piston 2 is provided with a valve sleeve 12 for the control valve, which projects rearwardly from the central part thereof. The valve sleeve 12 is slidably supported by means of a plain bearing 13 which is disposed in the rearward extension tube 7. The rear end of the sleeve 12 is opened toward the atmosphere introduction port 9.

The control valve 6 is constructed in the valve sleeve 12 in the following manner. Specifically, a first annular valve seat $14_1$ is formed on the inner wall of the fore part of the valve sleeve 12. A valve piston 16 which is connected to an input rod 15 to constitute the fore end part thereof is slided in the fore part of the valve sleeve 12. The valve piston 16 is formed with a second annular valve seat $14_2$ at the rear end thereof which is surrounded by the first valve seat $14_1$.

To the inner wall of the valve sleeve 12, a base end part 18 of a cylindrical valve body 17 which is opened at both ends thereof is held by clamping with the aid of a valve body retaining sleeve 19 which is fitted into the valve sleeve 12. The valve body 17 is made of elastomeric material such as rubber or the like and has a thin-walled diaphragm 20 extended radially inwardly from the base end part 18. Continuously with the inner peripheral end of the diaphragm 20 is formed a thick-walled valve portion 21 which is located opposite to the first and second valve seats $14_1$ and $14_2$ The valve portion 21 can move forwardly and rearwardly by deformation of the diaphragm 20 and moreover it can come in contact with the fore end surface of the valve body retaining sleeve 19.

The valve portion 21 includes an annular reinforcing plate 22 which is embedded therein and a valve spring 60 is connected to the reinforcement plate 22 so as to urge the valve portion 21 toward both the valve seats $14_1$ and $14_2$.

The outside part of the first valve seat $14_1$ is always communicated with the first working chamber A via communication hole 23 in the valve sleeve 12. The intermediate part of the first and second valve seats $14_1$ and $14_2$ is always communicated with the second working chamber B via another communication hole 24. The inside part of the second valve seat $14_2$ is always communicated with the atmosphere introduction port 9 via the interior of the valve body 17.

The valve sleeve 12 is formed with a larger diameter cylinder bore 25 at the central part of the front surface thereof and a smaller diameter cylinder bore 26 opened to the bottom end surface of the cylinder bore 25. A resilient piston 27 made of rubber or the like material and an output piston 28 having the same diameter as that of the resilient piston 27 are slidably fitted into the larger diameter cylinder bore 25 in the mentioned order from the front side. Further, a reaction piston 29 having a diameter smaller than that of the resilient piston 27 is slidably fitted in the smaller diameter cylinder bore 26. A smaller diameter shaft 30 projecting from the fore end surface of the valve piston 16 plunges into the smaller diameter cylinder bore 26 so as to oppose to the rear end surface of the reaction piston 29. An output rod 31 is projected from the fore surface of the output piston 28 and is jointed to an operating piston of a brake master cylinder which is not shown in the drawings.

The input rod 15 is always urged in the retreating direction under the effect of resilient force of a return spring 32 and its retreating movement is limited by allowing a movable stopper plate 33 threadably mounted on the input rod 15 to abut against the inside surface of the end wall 8 of the rearward extension tube 7. Since the threaded position between the movable stopper plate 33 and the input rod 15 is variable by rotating the movable plate 33 relative to the rod, the retreat limit of the input rod 15 can be adjusted in the forward and rearward directions as required. Fixation of the movable stopper plate 33 after completion of the retreat limit adjustment is achieved by tightening a lock nut 34 threadably mounted on the input rod 15. The movable stopper plate 33 is formed with a communication hole 35 in a manner that the atmosphere introduction port 9 is not closed by the movable stopper plate 33 from the atmosphere.

The opening portion at the outer end of the valve sleeve 12 is provided with filters 36 and 37 which serve to clean air introduced through the atmosphere introduction port 9. The filters can be deformed so as not to disturb actuation of the input rod 15.

Next, description will be made below as to the assembling structure of the valve sleeve 12 to the booster piston 2. The booster piston 2 is made of thin-walled steel plate in the form of a substantially circular disc in order to reduce its production cost. A valve sleeve insert hole 38 is formed at the central area of the booster piston 2 and the inner peripheral bead $3b$ is fitted around the inner edge of the valve sleeve insert hole 38.

The valve sleeve 12 is formed of synthetic resin such as phenol resin or the like and comprises a sleeve portion 39 inserted into the valve sleeve insert hole 38, i.e., fitted into the inner peripheral surface of the inner peripheral bead $3b$, and a disengagement preventive flange 40 projecting from the outer peripheral surface of the fore end part of the sleeve portion 39 and having a rear surface a thereof superposed on the fore surface b of the booster piston 2.

The disengagement preventive flange 40 is formed at its outer peripheral area with a pair of cutout concave portions 41 so as to be in a point symmetrical relation to each other around the center of the disengagement preventive flange 40, and a pair of convex portions 42 adapted to be engaged with the concave portions 41 are formed bulged on the fore surface b of the booster piston 2. Both the portions 41 and 42 constitute concavo-convex engagements respectively which prevent rotation of the valve sleeve 12 with respect to the booster piston 2.

As shown in FIG. 2, a pair of first engagement pawls $43_1$ and a pair of second engagement pawls $43_2$ which are hook-shaped, are provided on the booster piston 2 on opposite sides of a line X—X connecting both the convex portions 42, so as to surround the disengagement preventive flange 40. The first and second engagement pawls $43_1$ and $43_2$ are formed by cutting and bending operations and they are located adjacent to each other. Although the cut and bent engagement panels $43_1$ and $43_2$ leave cutout holes $51_1$ and $51_2$ in the booster piston 2, the cutout holes are covered by a relatively thick portion of the diaphragm 3 between the inner peripheral head $3b$ and the outer peripheral bead $3a$ as shown by FIG. 1.

The first engagement pawls $43_1$ and the second engagement pawls $43_2$ on both sides of the aforesaid line X—X are arranged in respective pairs in a point symmetrical relation to each other around the center of the booster piston 2. Moreover the foremost end $44_1$ of the first engagement pawl $43_1$ on one side of the line X—X and the foremost end $44_2$ of the second engagement pawl $43_2$ on the other side of said line are located opposite to one another.

Reinforcement ribs $46_1$ and $46_2$ are formed bulged on the first engagement pawls $43_1$ and the second engagement pawls $43_2$ so as to extend from their foremost ends $44_1$ and $44_2$ to a flat portion 45 of the booster piston 2.

A clamping plate 46 made of steel plate is mounted to the booster piston 2 by turning the plate about the center of the flange 40 in the clockwise direction as seen in FIG. 2 so as to hold the disengagement preventive flange 40 in a manner clamped between the plate 46 and the booster piston 2. The clamping plate 46 comprises a clamping plate body 47 superposed on the fore surface c of the disengagement preventive flange 40, a pair of arcuate bent parts 48 formed on the outer peripheral part of the clamping plate body 47 so as to be opposed to each other and loosely fitted around the outer peripheral surface of the disengagement preventive flange 40, and a pair of first engagement pieces $49_1$ and a pair of second engagement pieces $49_2$ projected radially outwardly from the outer peripheral edges of the arcuate bent parts 48 to come in resilient engagement with the inner surfaces of the foremost end parts $44_1$ and $44_2$ of the first and second engagement pieces $43_1$ and $43_2$.

Figure 3:
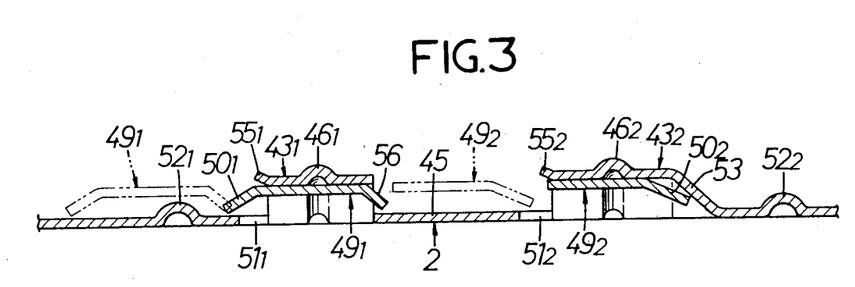
FIG. 3 is a fragmental sectional view of the booster taken along line III—III of FIG. 2.

As shown in FIG. 3, each of the first engagement pieces $49_1$ includes a disengagement preventive part $50_1$ formed on a side edge thereof located on the rear side of the turning direction of the clamping plate, while each of the second engagement pieces $49_2$ includes a disengagement preventive part $50_2$ on a side edge thereof located on the fore side of the turning direction of the clamping plate. Both the disengagement preventive parts $50_1$ and $50_2$ are bent inwardly to come close to the flat part 45 of the booster piston 2. A pair of reinforcement ribs $52_1$ and a pair of reinforcement ribs $52_2$ are formed bulged on the flat part 45 of the booster piston 2 in a manner that the ribs $52_1$ and $52_2$ extend to cross the turning direction of the clamping plate 46 to sandwich the cutout holes $51_1$ and $51_2$ of the first and second engagement pawls $43_1$ and $43_2$ therebetween. The foremost end of the disengagement preventive part $50_1$ of each of the first engagement pieces $49_1$ is located opposite to one of the reinforcement ribs $52_1$ which is located on the rear side of the turning direction of the clamping plate, and the foremost end of the disengagement preventive part $50_2$ of each of the second engagement pieces $49_2$ abuts against a side wall 53 which connects that side edge of the second engagement pawl $43_2$ which is on the fore side in the turning direction of the clamping plate, to the flat part 45 of the booster piston 2. This side wall 53 is formed at the same time when the second engagement pawl $43_2$ is provided by cutting and bending.

Owing to cooperation of both the disengagement parts $50_1$ and $50_2$, one of the reinforcement ribs $52_1$ and the side wall 53, the clamping plate 46 is inhibited from being turned about the center of the disengagement preventive flange 40 in the direction of disengagement, that is, in the clockwise and counterclockwise directions as seen in FIG. 2.

The respective parts of reinforcement ribs $52_1$ and $52_2$ effectively reinforce the areas surrounding the cutout holes $51_1$ and $51_2$ and each of the reinforcement ribs $52_1$ provided on the rear side as seen in the direction of turning of the clamping plate serves also to prevent disengagement of the clamping plate $52_1$ from its mounted position.

The inner peripheral bead 3b of the diaphragm 3 is fixed in place between the peripheral edge of the valve sleeve insert hole 38 and the outer surface of the valve sleeve 12 whereby the valve sleeve insert hole 38 is sealed. The clamp plate body 47 is formed with a pair of windows 54 one of which is located opposite to the opening part of the communication hole 23 in the valve sleeve 12.

The clamping plate 46 is mounted to the booster piston 2 in the following manner.

Namely, as represented by chain lines in FIGS. 2 and 3, the clamping plate body 47 is superposed on the fore surface c of the disengagement preventive flange 40 and each of the bent parts 48 is loosely fitted around the outer peripheral surface of the disengagement preventive flange 40 so that each of the first engagement pieces $49_1$ is located above the associated reinforcement rib $52_1$ which is on the rear side as seen in the turning direction of the clamping plate and each of the second engagement pieces $49_2$ is located between the first and second engagement pawls $43_1$ and $43_2$. Then, the clamping plate 46 is turned in the clockwise direction as seen in FIG. 2 while compressing the inner peripheral bead 3b of the diaphragm 3 by pressing the disengagement preventive flange 40 by the clamping plate 46. Thereby the first and second engagement pieces $49_1$ and $49_2$ are forcibly caused to come in slidable contact with the inner surfaces of the foremost end parts $44_1$ and $44_2$ of the first and second engagement pawls $43_1$ and $43_2$.

At this moment, each of the convex portions 42 of the booster piston 2 is kept in engagement with the mating concave portion 41 of the disengagement preventive flange 40 and thereby any turning movement of the valve sleeve 12 relative to the booster piston 2 is reliably inhibited. Accordingly, when the first and second engagement pieces $49_1$ and $49_2$ are brought in engagement with the first and second engagement pawls $43_1$ and $43_2$, there is no fear that the inner peripheral bead 3b of the diaphragm 3 is twisted.

Further, the disengagement preventive part $50_1$ of the first engagement piece $49_1$ easily rides over the mating reinforcement rib $52_2$ owing to its resiliency and therefore each of the reinforcement rib $52_1$ permits turning movement of the clamping plate 46 in the engaging direction. Moreover, guides $55_1$ and $55_2$ bent outwardly away from the flat part 45 of the booster piston 2 are formed along the side edges on respective rear sides of the first and second engagement pawls $43_1$ and $43_2$ as seen in the turning direction of the clamp plate, while a guide 56 bent inwardly to come close to the flat part 45 of the booster piston 2 is formed along the side edge on the fore side of each of the first engagement pieces $49_1$. Since the disengagement preventive part $50_2$ of each of the second engagement pieces $49_2$ serves as guiding means, sliding movement of each of the first and second engagement pieces $49_1$ and $49_2$ relative to each of the first and second engagement pawls $43_1$ and $43_2$ are carried out smoothly.

Figure 4A:
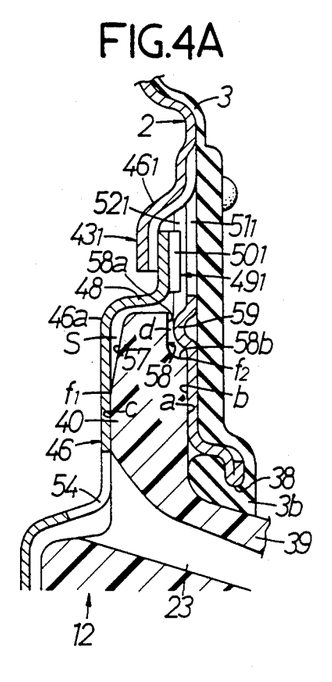

As shown in FIG. 4A, the outer peripheral portion of the fore surface c of the disengagement preventive flange 40 is formed as a tapered surface 57 which spreads wider as approaching the rear surface a from the fore surface c, and an arcuate hollow space S is defined between the tapered surface 57 and an engagement piece joint part 46a of the clamp plate 46 located opposite to the tapered surface 57. Due to provision of the hollow space S, a fulcrum $f_1$ of flexing or bending of the first and second engagement pieces $49_1$ and $49_2$ is located at the fore edge part on the inner peripheral side of the tapered surface 57 and this allows a distance between the fulcrum $f_1$ and each of the first and second engagement pieces $49_1$ and $49_2$ to be elongated whereby spring function of the first and second engagement pieces $49_1$ and $49_2$ increases correspondingly. As a result, sliding engagement of the first and second engagement pieces $49_1$ and $49_2$ with the first and second engagement pawls $43_1$ and $43_2$ can be achieved easily and moreover a resilient engagement force of the first and second engagement pieces $49_1$ and $49_2$ increases.

Further, as shown in FIG. 4A, an annular relief 58 is formed at the whole outer peripheral part of the rear surface a of the disengagement preventive flange 40 including both the concave portions 41 and this relief 58 has a contact surface 58a located in an area exclusive of both the portions 41 and distanced from the fore surface b of the booster piston 2. A pair of semiannular reinforcement ribs 59 having respective opposite ends connected to the convex portions 42 are formed bulged from the flat part 45 of the booster piston 2 toward a position opposed to the contact surface 58a. Each of the reinforcement ribs 59 is formed so as to have an arcuate cross-sectional shape.

There is provided a predetermined clearance d between the contact surface 58a and the reinforcement rib 59 whereby a fulcrum $f_2$ of flexing of the booster piston 2 is located at the rear edge of a joint surface 58b of the relief 58 which is formed between the contact surface 58a and the rear surface a.

Both the annular reinforcement ribs 59 are intended to restrict an extent of flexing of the booster piston 2 by allowing the annular reinforcement ribs 59 to come in contact with the contact surface 58a when such extent of flexing of the booster piston 2 in the forward direction relative to the aforesaid fulcrum $f_2$ increases. A resilient engagement force of the first and second engagement pieces $49_1$ and $49_2$ is so set that the first and second engagement pieces $49_1$ and $49_2$ do not come out of engagement with the first and second engagement pawls $43_1$ and $43_2$ when the annular reinforcement ribs 59 are in contact with the contact surface 58a.

Next, operation of the booster in accordance with the first embodiment will be described below. FIG. 1 illustrates that the booster is held in an inoperative state. The valve piston 16 and the input rod 15 which are connected to one another are maintained under the effect of resilient force of the return spring 32 at a predetermined retreat position where the movable stopper plate 33 comes in contact with the stationary end wall 8 and the valve piston 16 presses the fore surface of the valve portion 21 via the second valve seat $14_2$ to make that fore surface move backward until it comes in slight contact with the fore surface of the valve body retaining sleeve 19. Thereby a small clearance g is created between the first valve seat $14_1$ and the valve portion 21. Such a state can be easily obtained by adjusting the movable stopper plate 33.

Under the above-described condition, the first working chamber A in which a vacuum pressure is always stored during operation of the engine is communicated with the second working chamber B via the communication hole 23, the clearance g and the communication hole 24, and the opening part at the fore surface of the valve portion 21 is closed by the second valve seat $14_2$.

Thus the vacuum pressure in the first working chamber A is transmitted into the second working chamber B and the pressure in both the working chambers A and B becomes equalized. Accordingly, the booster piston 2 assumes the illustrated retreat position under the effect of resilient force of the return spring 10.

When a brake pedal which is not shown in the drawings is depressed to brake a vehicle and thereby the input rod 15 and the valve piston 16 are caused to move forwardly, the valve portion 21 which is normally urged forwardly by means of the valve spring 60 moves forwardly while following forward movement of the valve piston 16. Since the clearance g between the first valve seat $14_1$ and the valve portion 21 is very narrow as mentioned above, the valve portion 21 seats on the first valve seat $14_1$ immediately to interrupt communication between both the working chambers A and B and at the same time the second valve seat $14_2$ is parted away from the valve portion 21, resulting in that the second working chamber B is communicated with the atmosphere introduction port 9 via the communication hole 24 and the interior of the valve body 17. Accordingly, atmosphere is promptly introduced into the second working chamber B and thereby the second working chamber B has a pressure higher than that in the first working chamber A. As a result, the booster piston 2 moves forwardly against resilient force of the return spring 10 due to difference in pressure developed between both the working chambers A and B and the output rod 31 is caused to move forwardly via the resilient piston 27. Thus, an actuating piston in the brake master cylinder is driven forwardly to brake the vehicle.

When the smaller diameter shaft 30 of the valve piston 16 comes in contact with the resilient piston 27 via the reaction piston 29 by forward movement of the shaft 30, the resilient piston 27 is expansively deformed toward the reaction piston 29 by the operative reaction force of the output rod 31 and a part of the reaction force is fed back to the brake pedal side via the valve piston 16 whereby a driver can sense output of the output rod 31, that is, braking force.

When the booster piston 2 moves forwardly, the booster piston 2 deflects forwardly due to difference in pressure developed between both the working chambers A and B, and deflection of the booster piston 2 caused at that time is supported by the fulcrum $f_2$ located on the rear surface of the disengagement preventive flange 40.

Figure 4B:
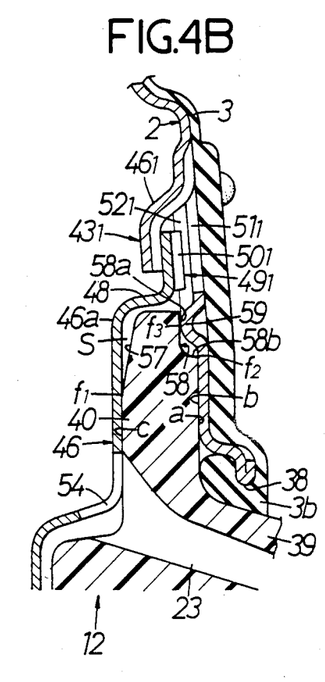

On the other hand, when an extent of forward deflection of the booster piston 2 increases due to excessive difference in pressure between both the working chambers A and B, the reinforcement rib 59 comes in contact with the contact surface 58a of the disengagement preventive flange 40 as shown in FIG. 4B and the aforesaid extent of deflection of the booster piston 2 is restricted thereby. As a result, the first and second engagement pawls $43_1$ and $43_2$ can not be moved forward any more. Further, in this state, the resilient engagement force of the first and second engagement pieces $49_1$ and $49_2$ relative to the first and second engagement pawls $43_1$ and $43_2$ is maintained effective so that the first and second engagement pieces $49_1$ and $49_2$ are not disengaged from the first and second engagement pawls $43_1$ and $43_2$.

At this moment deflection of the booster piston 2 is supported at the abutting portion between the reinforcement rib 59 and the contact surface 58a as a fulcrum $f_3$. Since the fulcrum at which deflection of the booster piston 2 is supported varies between points $f_2$ and $f_3$ in dependence on the magnitude of difference in pressure between both the working chambers A and B in the above-described manner, stress caused due to the aforesaid deflection does not concentrically act on a single place on the booster piston 2, resulting in durability of the booster piston 2 being improved.

When depressing force on the brake pedal is released, the input rod 15 is caused to move rearwardly under the effect of reaction force acting on the valve piston 16 and resilient force of the spring 32, thereby the second valve seat $14_2$ seats on the valve portion 21 and the valve portion 21 comes in contact with the fore surface of the valve body retaining sleeve 19. Thus, the valve portion 21 is deformed and compressed under the influence of rearward movement force of the input rod 15. In consequence, there is developed a clearance larger than the initial clearance g between the first valve seat $14_1$ and the valve portion 21 whereby air pressures in both the working chambers A and B become quickly equalized through the thus increased clearance. Once difference in pressure disappears, the booster piston 2 is caused to move rearwardly under the effect of resilient force of the return spring 10 and the projections 11 on the diaphragm 3 come in contact with the inner surface of the rear wall of the booster shell 1, causing them to be stopped. When the input rod 15 comes in contact with the rear wall 8, the valve portion 21 is released from rearward movement force of the input rod 15 to assume its original state. Thus, the clearance between the first valve seat $14_1$ and the valve portion 21 can be narrowed to the smaller clearance g again.

Next, description will be made below as to a booster made in accordance with a second embodiment of the present invention with reference to FIGS. 5, 6A and 6B. The second embodiment is different from the first embodiment merely in respect of the state of arrangement of the reinforcement rib 59 formed on the booster piston 2 relative to the rear surface of the disengagement preventive flange 40. The other structure is the same as that in the first embodiment. Accordingly, description will be made below only as to different parts. Incidentally, same members as those in the first embodiment are identified by same reference numerals.

Figure 5:
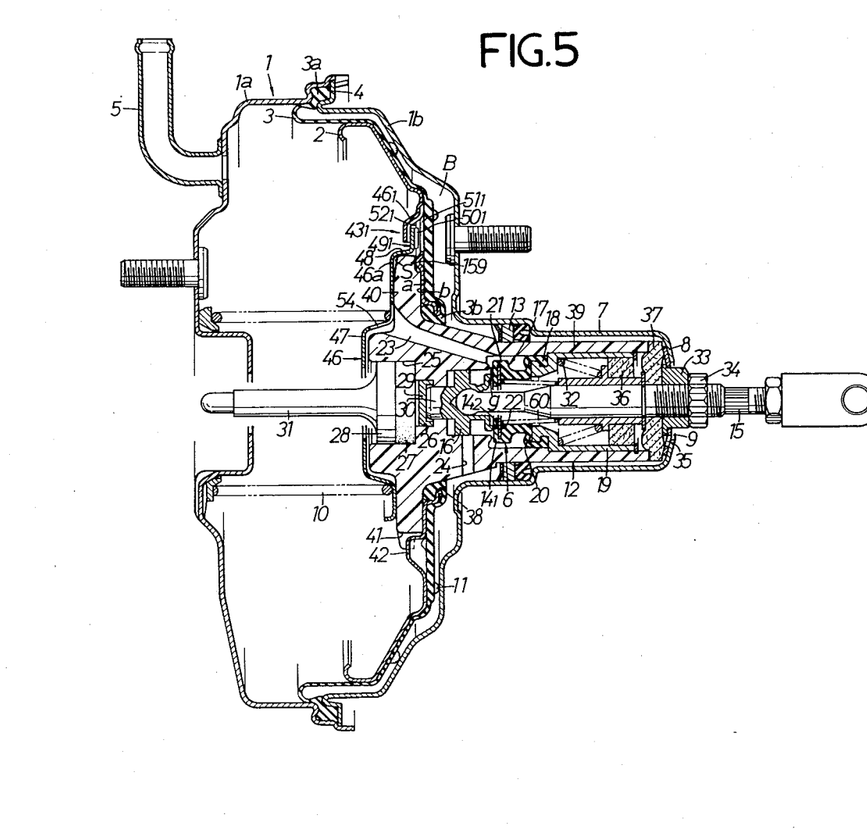
FIG. 5 is a vertical sectional view of the whole structure of the booster similar to FIG. 1.
Figure 6A:
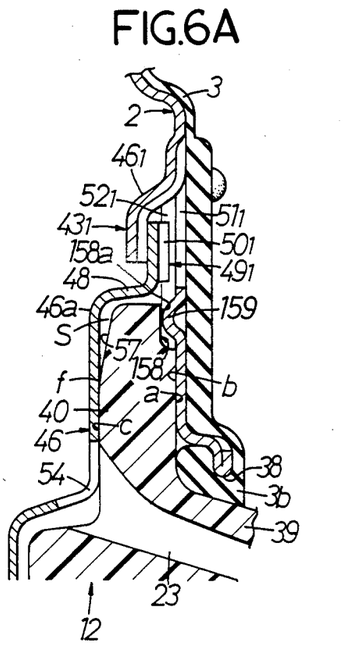
Figure 6B:
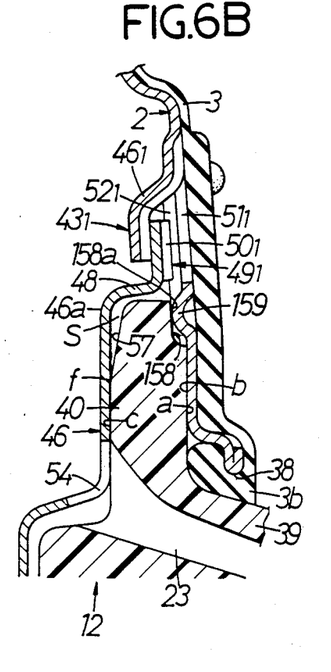

As shown in FIGS. 5, 6A and 6B, a pair of semiannular reinforcement ribs 159 are formed bulged on the fore surface of the booster piston 2 so as to protrude forwardly and each of the reinforcement ribs 159 has an arcuate cross-sectional shape in the same manner as in the first embodiment. On the other hand, a recess 158 formed on the disengagement preventive flange 40 has a depth in the axial direction shallower than the recesses 58 in the first embodiment and the top or ridge of each of the reinforcement ribs 159 is always placed in contact with the contact surface 158a of the recess 158. Each of the reinforcement ribs 159 can be deformed so as to expand outwardly in the radial direction of the booster piston 2, as the latter is deformed forwardly. Specifically, as shown in FIG. 6B, at the time of advancing movement of the booster piston 2, if the piston is deflected forwardly due to difference in pressure between both the working chambers A and B, each of the reinforcement ribs 159 is deformed and expanded radially outwardly and an extent of deformation of the ribs increases corresponding to the increase in an extent of deflection of the piston 2. This causes a contact area of the reinforcement rib 159 with the contact surface 158a for supporting deflection of the booster piston 2 to be increased. As a result, stress caused by deflection of the booster piston 2 does not concentrically act on a single place on the booster piston 2 and moreover moment of the booster piston 2 reduces, resulting in durability of the booster piston 2 being improved.

While the present invention has been described above only with respect to two preferred embodiments, it should of course be understood that it should not be limited only to the illustrated embodiments but various changes or modification may be made in a suitable manner without departure from the spirit and scope of the present invention as defined by the appended claims.

What is claimed is:

1. A vacuum type booster comprising
a booster shell,
a booster piston accommodated in an interior of said booster shell so as to be reciprocatively movable forwardly and rearwardly and dividing the interior of the booster shell into a first working chamber leading to a vacuum source and a second working chamber adapted to be selectively communicated with said first working chamber and the atmosphere via a control valve,
a valve sleeve for said control valve, said valve sleeve being fitted into a valve sleeve fitting hole provided in a central area of the booster piston and having a disengagement preventive flange which is superposed on a fore surface of the booster piston facing said first working chamber, and
a clamp plate placed in resilient engagement with a plurality of engagement pawls which are formed by cutting portions of the booster piston and bending said portions for clamping said disengagement preventive flange in cooperation with the booster piston, the engagement of the clamp plate with the pawls being obtained by turning the clamp plate around a center line of the disengagement preventive flange,
wherein the booster piston is provided with pairs of reinforcement ribs extending so as to cross the turning direction of the clamp plate, said reinforcement ribs in respective pairs being located to sandwich therebetween a cutout hole which is provided in the booster piston as a result of cutting and bending formation of each of the engagement pawls, one pair of the reinforcement ribs being located on a rear side of the booster piston in the turning direction of the clamp plate and serving to permit the clamp plate to be turned in such a direction that the plate comes in engagement with the engagement pawls and prevent the clamp plate, after completion of such engagement, from being turned in a direction that the plate disengages from the pawls.

2. The vacuum type booster of claim 1 wherein the booster piston is formed with side walls by cutting and bending operations for inhibiting the clamp plate from being further turned in the direction of engagement after completion of engagement of the clamp plate with the engagement pawls.

3. The vacuum type booster of claim 2 wherein the clamp plate includes a plurality of engagement pieces which are engageable with said plurality of engagement pawls on the booster piston, respectively.

4. The vacuum type booster of claim 3 wherein said plurality of engagement pieces comprise a pair of first engagement pieces and a pair of second engagement pieces which are arranged on a peripheral edge part of the clamp plate in a point symmetrical relationship to each other in respective pairs relative to the center of the clamp plate and wherein said first engagement pieces are located on the clamp plate at a rear side thereof in its turning direction while said second engagement pieces are located on the clamp plate at a fore side thereof in its turning direction.

5. The vacuum type booster of claim 4 wherein each of said first engagement pieces includes a disengagement preventive part bent inwardly to come close to the booster piston along a rear side edge of the first engagement piece in the direction of turning of the clamp plate, and each of said second engagement pieces includes a disengagement preventive part bent inwardly to come close to the booster piston along a fore end edge of the second engagement piece in the direction of turning of the clamp plate, said disengagement preventive parts of the first engagement pieces being engageable with said reinforcement ribs and said disengagement preventive parts of the second engagement pieces being engageable with said side walls, respectively.

6. The vacuum type booster of claim 3 wherein said plurality of engagement pawls are formed along side edges thereof with guides which are bent outwardly away from the booster piston and each of said guides serves to facilitate engagement of the engagement piece with the associated engagement pawl.

7. The vacuum type booster of claim 1, further including
a diaphragm superposed on a rear surface of said booster piston facing said second working chamber, said diaphragm having an outer peripheral bead fixedly secured to a peripheral wall of the booster shell and an inner peripheral bead fitted to an open edge of said valve sleeve fitting hole provided in a central area of the booster piston,
said valve sleeve being fitted into an inner peripheral surface of the inner peripheral bead and
wherein the booster piston and the disengagement preventive flange are provided with concavo-convex engaging means which inhibit the valve sleeve from being turned.

8. The vacuum type booster of claim 7 wherein said concavo-convex engaging means comprise a concave portion and a convex portion adapted to be engaged with said concave portion, the concave portion being formed by notching an outer peripheral part of the disengagement preventive flange and said convex portion being formed as a bulge on a fore surface of the booster piston facing said first working chamber.

9. The vacuum type booster of claim 8 wherein there are provided a plurality of the concave portions arranged in a point-symmetrical relation relative to the center of the disengagement preventive flange.

10. The vacuum type booster of claim 1 further comprising a diaphragm superposed on a rear surface of said booster piston facing said second working chamber, said diaphragm having an outer peripheral bead fixedly secured to a peripheral wall of the booster shell and an inner peripheral bead fitted to an open edge of said valve sleeve fitting hole, said diaphragm having a portion which covers said cutout holes of the booster piston and seals said cutout holes between the first and second working chambers.

11. The vacuum type booster of claim 10 wherein said portion of the diaphragm which covers said cutout holes is a relatively thick portion of said diaphragm intermediate said inner and outer peripheral bead.

12. A vacuum type booster comprising
a booster shell,
a booster piston accommodated in an interior of said booster shell so as to be reciprocatively movable forwardly and rearwardly and dividing the interior of the booster shell into a first working chamber leading to a vacuum source and a second working chamber adapted to be selectively communicated with said first workinq chamber and the atmosphere via a control value,
a valve sleeve for said control valve, said valve sleeve being fitted into a valve sleeve fitting hole provided in a central area of the booster piston and having a disengagement preventive flange which is superposed on a fore surface of the booster piston facing said working chamber, and
a clamp plate including a clamp plate body adapted to be superposed on a fore surface of said disengagement preventive flange facing said first working chamber and a plurality of engagement pieces connected to said clamp plate body so as to project radially outwardly of the disengagement preventive flange, said engagement pieces being adapted to come in resilient engagement with a plurality of engagement pawls formed on the booster piston so as to clamp the disengagement preventive flange in cooperation with the booster piston,
wherein a hollow space is provided between an outer peripheral part of the fore surface of the disengagement preventive flange and those parts of the clamp plate body which are connected to the engagement pieces and are located opposite to said outer peripheral part of the fore surface of the disengagement preventive flange, said hollow space permitting flexing of the clamp plate toward the booster piston at the time of engagement and disengagement therebetween.

13. The vacuum type booster of claim 12 wherein the disengagement preventive flange is provided at its outer peripheral part of the fore surface with a tapered surface.

14. The vacuum type booster of claim 13 wherein said hollow space is defined between said tapered surface and the parts of the clamp plate body which are connected to the engagement pieces and are located opposite to the tapered surface.

15. The vacuum type booster of claim 13 wherein the parts of the clamp plate body connected to the engagement pieces can be flexed about a fulcrum provided by the radially inner end of the tapered surface.

16. A vacuum type, booster comprising
a booster shell,
a booster piston accommodated in an interior of said booster shell so as to be reciprocatively movable forwardly and rearwardly and dividing the interior of the booster shell into a first working chamber leading to a vacuum source and a second working chamber adapted to be selectively communicated with said first working chamber and the atmosphere via a control valve,
a valve sleeve for said control valve, said valve sleeve being fitted into a valve sleeve fitting hole provided in a central area of said booster piston and having a disengagement preventive flange which is superposed on a fore surface of the booster piston, and
a clamp plate placed in resilient engagement with a plurality of engagement pawls formed on the booster piston for clamping said disengagement preventive flange in cooperation with the booster piston, wherein the booster piston is provided with reinforcement ribs of an arcuate cross-sectional shape which project forwardly and come in contact with an outer peripheral part of a rear surface of the disengagement preventive flange and wherein a contact area of each of the reinforcement ribs with the disengagement preventive flange is adapted to expand outwardly in a radial direction of the booster flange in response to the reinforcement ribs being deformed by forward deflection of the booster piston.

17. The vacuum type booster of claim 16 wherein the reinforcement ribs are formed bulged on the booster piston so as to be in a pair of semi-annular arrangements.

18. A vacuum type booster comprising a booster shell, a booster piston accommodated in an interior of said booster shell so as to be reciprocatively movable forwardly and rearwardly and dividing the interior of the booster shell into a first working chamber leading to a vacuum source and a second working chamber adapted to be selectively communicated with said first working chamber and the atmosphere via a control valve, a valve sleeve for said control valve, said valve sleeve being fitted into a valve sleeve fitting hole provided in a central area of said booster piston and having a disengagement preventive flange which is superposed on a fore surface of the booster piston, and a clamp plate held in resilient engagement with a plurality of engagement pawls formed on the booster piston for clamping said disengagement preventive flange in cooperation with the booster piston, the engagement of said clamp plate with the engagement pawls being obtained by turning the clamp plate about a center line of the disengagement preventive flange, wherein the disengagement preventive flange is formed at a rear surface thereof with a relief extending around a whole outer peripheral part of the rear surface, said relief including a contact surface which is located away from the fore surface of the booster piston, and wherein at a portion of the booster piston opposed to the contact surface, a reinforcement rib is provided for limiting an extent of forward deflection of the booster piston by contacting with said contact surface when said extent of forward deflection of the booster piston increases, a certain clearance being kept between the contact surface and said reinforcement rib.

19. The vacuum type booster of claim 18 wherein the booster piston is deflected about a rear edge, serving as a fulcrum, of a connecting surface provided on the disengagement preventive flange between the contact surface and the rear surface thereof.

* * * * *